J. G. McDOWELL.
RECIPROCATING MOTOR.
APPLICATION FILED AUG. 28, 1907.
914,744.
Patented Mar. 9, 1909.
3 SHEETS—SHEET 3.
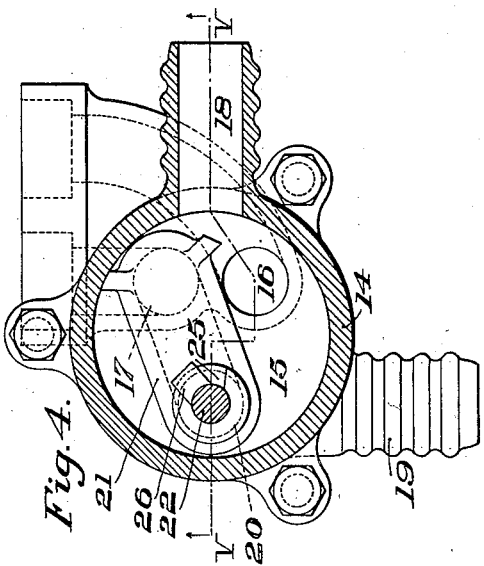
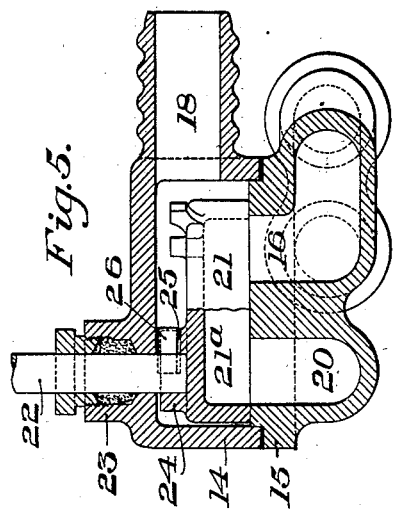
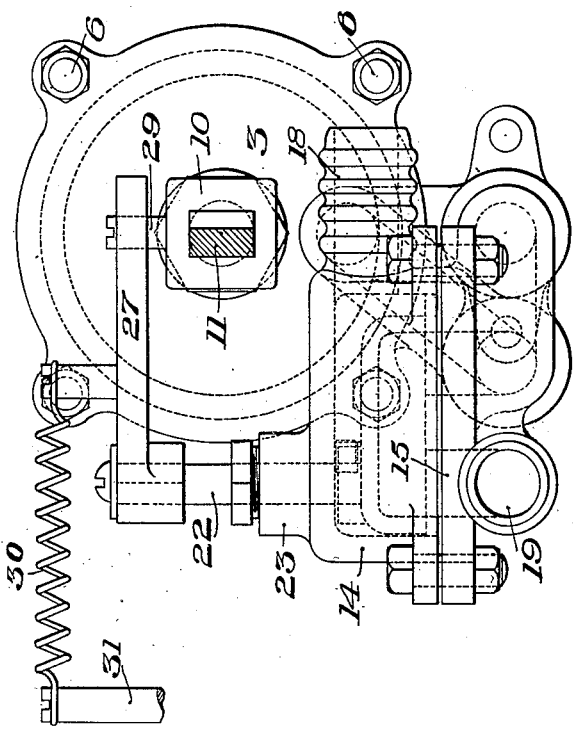
WITNESSES
INVENTOR
J. G. McDowell,

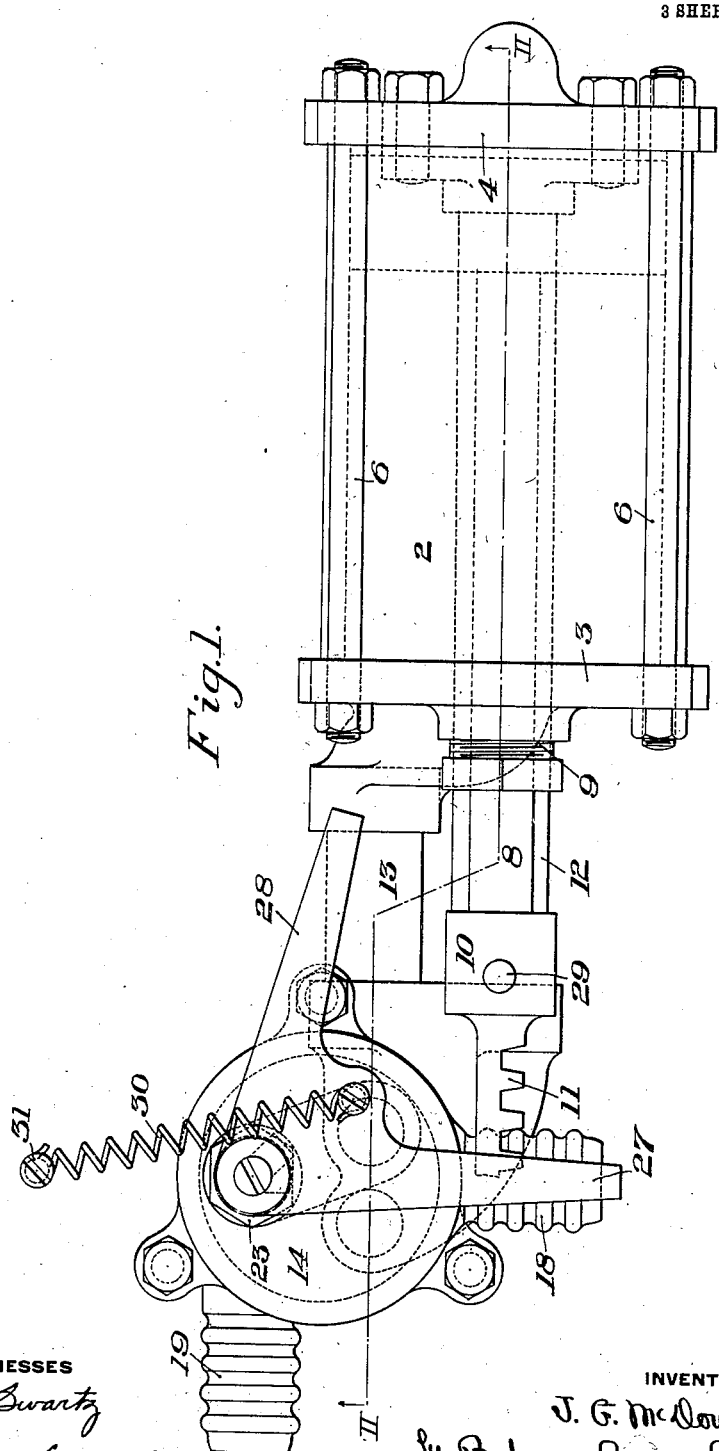

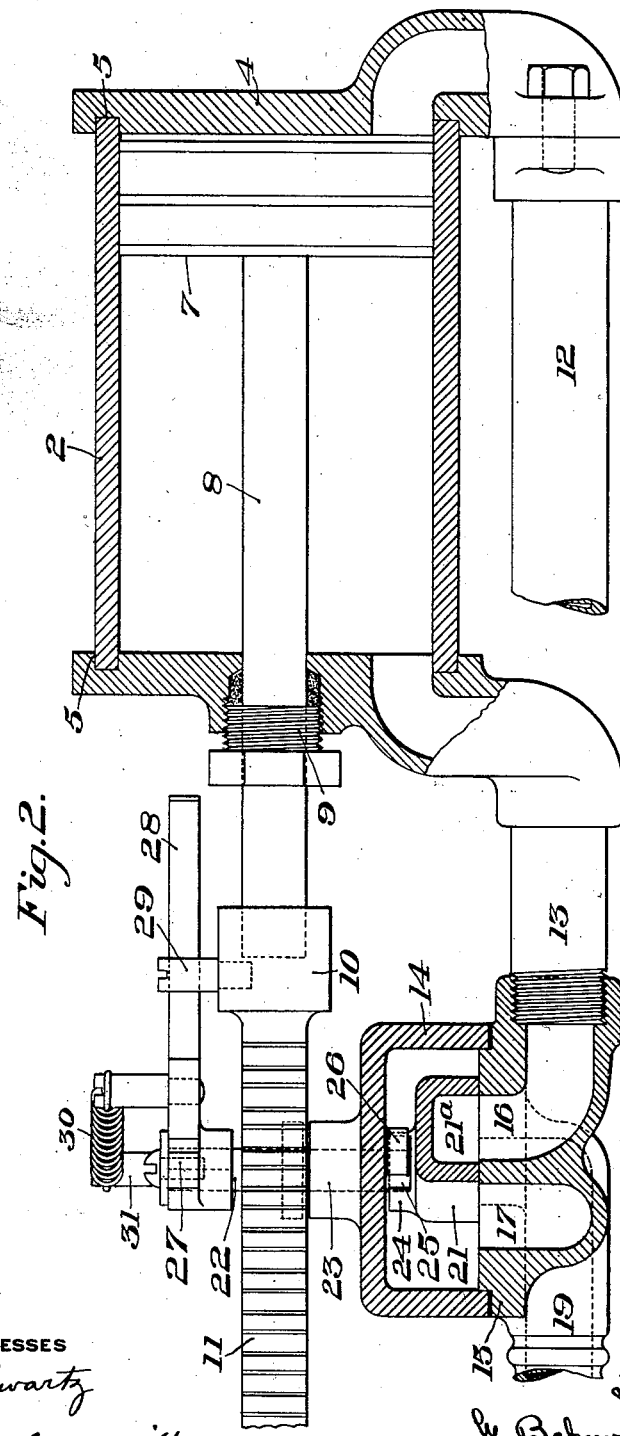

UNITED STATES PATENT OFFICE.

JOHN G. McDOWELL, OF PITTSBURG, PENNSYLVANIA.

RECIPROCATING MOTOR.

No. 914,744.

Specification of Letters Patent.

Patented March 9, 1909.

Application filed August 28, 1907. Serial No. 390,441.

*To all whom it may concern:*

Be it known that I, JOHN G. McDOWELL, of Pittsburg, Allegheny county, Pennsylvania, have invented a new and useful Reciprocating Motor, of which the following is a full, clear, and exact description, reference being had to the accompanying drawings, forming part of this specification, in which—

Figure 1 is a plan view of a motor illustrating my invention; Fig. 2 is a section on the irregular line II—II of Fig. 1; Fig. 3 is a front elevation; Fig. 4 is a horizontal section showing the valve mechanism; and Fig. 5 is a vertical section on the line V—V of Fig. 4.

My invention has relation to the class of hydraulic motors, and is designed to provide a simple and efficient form of motor which can be manufactured at a comparatively low cost, and which is particularly adapted for operating small machines, although it is not limited in this respect.

The precise nature of my invention will be best understood by reference to the accompanying drawings, in which I have shown one embodiment thereof, and which will now be described, it being premised, however, that various changes may be made in the details of construction and arrangement by those skilled in the art, without departing from the scope of my invention, as defined in the appended claims.

In these drawings, the numeral 2 designates the motor cylinder which is preferably constructed with separate ends or heads 3 and 4, having annular recesses 5 therein to receive the ends of the cylinder body, the whole being secured together by through bolts 6.

7 designates the motor piston and 8 the piston rod which extends outwardly through a stuffing box 9 in the head 3, and which is connected in any suitable manner to the mechanism to be operated. In the drawings, I have shown a head 10 carrying a rack bar 11 whose teeth may engage a pinion on a shaft, to be operated (not shown).

12 designates a combined inlet and outlet pipe which communicates with one end of the cylinder through the head 4, and 13 a similar pipe which communicates with the opposite end of the cylinder through the head 3. These two pipes are connected to the lower end of a valve casing formed by an upper member 14 and a base portion 15 having the respective circulating ports or passages 16 and 17 with which the pipes 13 and 12 respectively connect said ports opening upwardly into the valve chamber through this base member.

18 designates an inlet pipe which leads into the upper portion of the valve chamber through the upper casing member 14, and 19 is an outlet pipe which is connected to the base member of the valve casing and communicates with the valve chamber by the port 20.

21 is an oscillating valve which is seated in the valve chamber upon the upper face of the base member 15, and is loosely sleeved upon a vertical stem 22 which extends upwardly through a stuffing box 23 on the top casing member 14. The hub or boss 24 of the valve which is seated on the stem or spindle 22 has a cut-away segment 25, and the connection between the valve and the stem or spindle is formed by a lug 26 on the stem which projects into the cut-away segment of said boss. This forms a lost motion connection between the stem and valve, so that the valve is operated only after the stem or spindle has moved to a sufficient extent to cause the engagement of the lug with one or the other of the end walls of the cut-away portion of the valve boss. Keyed or otherwise secured to the upper projecting end of the stem or spindle is a tappet having the two arms 27 and 28 which are arranged to be alternately engaged by a pin or stud 29 secured in or carried by the head 10 of the piston rod 8. Connected at one end to the tappet is a spring 30 whose other end is attached to a fixed support 31, said spring being so arranged, as to be moved past a center line, and to act in reverse directions upon the valve. The valve 21 has an internal chamber 21ª open at its bottom and arranged to connect either of the ports 16 or 17 with the exhaust port 20 leading to the outlet connection 19.

The operation is as follows:—The parts being in the position shown in Fig. 2, water enters the valve chamber by way of the inlet 18 and passes to the cylinder by the port 17 which is uncovered by the valve and the pipe 12, thereby moving the piston 7 to the left. As the piston approaches the limit of its stroke in this direction, the pin or stud 29 engages the tappet arm 27, and thereby rotates the valve stem or spindle. As before described this stem or spindle has a certain amount of lost motion before the lug 26 engages the valve, this engagement taking place just at the time the spring 30 is carried past the center line by movement of the tappet. The spring then acts to throw the valve to its other position with a quick movement, thereby opening the port 16 and connecting the ports 17 and 20. Water now enters the other end of the cylinder by way of the port 16 and pipe 13. When the piston approaches the other limit of its stroke, the stud 29 engages the tappet arm 28, and effects the reverse movement of the valve. The exhaust during each stroke of the piston takes place through the valve which is in position to connect the port leading to the exhausting end of the cylinder with the outlet port 20.

The valve arrangement shown and described consists of but few parts, simple in construction, the operation of the valve being effected wholly automatically and in a quick, positive, manner by the provision of the lost motion connection and the spring. The entire motor can be constructed at a comparatively low cost, and is especially adapted for household and other light work, as it can be readily operated by connection with an ordinary service pipe or other low pressure source of supply.

What I claim is:—

1. A motor comprising a cylinder having a piston, a valve chamber having an exhaust port and a pair of feed ports piercing the same wall of the chamber, the feed ports also communicating with the respective ends of the cylinder, a hollow valve working in the chamber in continuous communication with the exhaust port, the valve chamber being provided with an inlet port in continuous communication therewith externally of the valve, a valve stem projecting externally of the chamber and having a lost motion connection with the valve, and connections with the stem operated by the movement of the piston to operate the valve.

2. A motor comprising a cylinder having a piston, a valve chamber, a hollow valve in the valve chamber and working across the bottom thereof, the valve chamber having an exhaust port leading through the bottom thereof and in continuous communication with the valve, there being a pair of feed ports communicating with the valve chamber through the bottom and with the respective ends of the cylinder, the valve chamber having an inlet port in continuous communication therewith above the valve, a valve stem having a lost motion connection with the valve and projecting externally of the chamber, a tappet device carried by the outer portion of the stem, a piston rod working across the valve chamber, and means on the piston rod for actuating the tappet device, substantially as described.

3. In a hydraulic motor of the character described, a case a valve therein, a stem projecting externally of the case and having a lost motion connection with the valve, a tappet device carried by the projecting portion of the stem and having two arms at an angle to each other, a reversely acting spring connected to the tappet, and a piston rod having a projection working between and arranged to successively engage the tappet arms; substantially as described.

4. In a hydraulic motor, a horizontal cylinder, a piston working therein, a valve chamber separate and independent of the cylinder and located beyond one end thereof, combined inlet and outlet pipes leading from the ends of the cylinder into the bottom of the valve chamber and communicating with said chamber through ports in the bottom wall thereof, an oscillating valve seated upon said bottom wall, a stem for actuating said valve extending upwardly through the top wall of the valve chamber, a tappet device including radial arms carried by the top of the stem, a piston rod working across the arms, and a projection upon the piston rod working between the arms for successive engagement therewith, substantially as described.

In testimony whereof, I have hereunto set my hand

JOHN G. McDOWELL.

Witnesses:
  GEO. B. BLEMING,
  GEO. H. PARMELEE.